(12) United States Patent
Maekawa et al.

(10) Patent No.: US 7,266,601 B2
(45) Date of Patent: Sep. 4, 2007

(54) METHOD AND APPARATUS FOR MANAGING NETWORK DEVICES

(75) Inventors: Yoshito Maekawa, Kanagawa (JP); Toshiaki Igarashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 680 days.

(21) Appl. No.: 10/191,547

(22) Filed: Jul. 10, 2002

(65) Prior Publication Data

US 2003/0014511 A1    Jan. 16, 2003

(30) Foreign Application Priority Data

Jul. 16, 2001  (JP)  ............... 2001-215932
Jun. 20, 2002  (JP)  ............... 2002-180060

(51) Int. Cl.
*G06F 15/173* (2006.01)
(52) U.S. Cl. .................. 709/224; 709/223; 709/217
(58) Field of Classification Search ........ 709/223–225, 709/217
See application file for complete search history.

(56) References Cited

U.S. PATENT DOCUMENTS

| | | | | |
|---|---|---|---|---|
| 5,220,674 A | * | 6/1993 | Morgan et al. ............. | 709/223 |
| 5,655,081 A | * | 8/1997 | Bonnell et al. ............. | 709/202 |
| 5,745,693 A | * | 4/1998 | Knight et al. ............... | 709/224 |
| 5,854,897 A | * | 12/1998 | Radziewicz et al. ........ | 709/224 |
| 5,862,404 A | * | 1/1999 | Onaga ........................ | 709/223 |
| 5,984,178 A | * | 11/1999 | Gill et al. .................... | 235/379 |
| 5,991,806 A | * | 11/1999 | McHann, Jr. ............... | 709/224 |
| 6,049,828 A | * | 4/2000 | Dev et al. ................... | 709/224 |
| 6,094,681 A | * | 7/2000 | Shaffer et al. .............. | 709/224 |
| 6,139,177 A | * | 10/2000 | Venkatraman et al. ...... | 715/513 |
| 6,167,448 A | * | 12/2000 | Hemphill et al. ........... | 709/224 |
| 6,714,977 B1 | * | 3/2004 | Fowler et al. ............... | 709/224 |
| 2003/0120775 A1 | * | 6/2003 | York .......................... | 709/224 |

FOREIGN PATENT DOCUMENTS

| | | |
|---|---|---|
| EP | 0 843 268 | 5/1998 |
| EP | 843268 A2 * | 5/1998 |
| EP | 1 096 724 | 5/2001 |
| EP | 1096724 A1 * | 5/2001 |

OTHER PUBLICATIONS

J. Reilly, et al., "Enabling mobile network managers", Computer Networks And ISDN Systems, Nodh Holland Publishing, Amsterdam, NL, vol. 29, No. 8-13, Sep. 1, 1997, pp. 1417-1428.*

(Continued)

*Primary Examiner*—Glenton B. Burgess
*Assistant Examiner*—Brendan Y. Higa
(74) *Attorney, Agent, or Firm*—Fitzpatrick, Cella, Harper & Scinto

(57) ABSTRACT

A sever manages a network device connected to a network by storing location information of a providing site that provides state information associated with the network device and a status of the network device. The server determines whether a change in state of the network device has occurred by communicating with the network device, and if so, acquires the stored location information. Then, the server generates an electrical message (an e-mail message, for example) which contains the acquired location information associated with the network device and the determined state of the network device. The electrical message is sent by the server to a user's computer related to a predetermined address such tat the location information can be used by a displaying application in the user's computer to acquire information related to the network device.

31 Claims, 12 Drawing Sheets

| 1001 | 1002 |
|---|---|
| ERROR CATEGORY | URL ADDRESS OF WEB PAGE |
| ERROR CATEGORY 1 | URL ADDRESS 1 |
| ERROR CATEGORY 2 | URL ADDRESS 2 |
| ERROR CATEGORY 3 | URL ADDRESS |

OTHER PUBLICATIONS

J. Reilly, et al., "Enabling mobile network managers", Computer Networks And ISDN Systems, North Holland Publishing, Amsterdam, NL, vol. 29, No. 8-13, Sep. 1, 1997, pp. 1417-1428.

M.T. Rose, Takeshi Nishida, "Practical Management: An Introduction To Management Of TCP/IP-based Internets", Contents, Preface, Chapter 5, Toppan Printing Co., LTD., Aug. 20, 1992 (First Edition) for SNMP.

* cited by examiner

| NETWORK DEVICE | MAC ADDRESS | IP ADDRESS | DEVICE NAME | LOCATION |
|---|---|---|---|---|
| 101 | 0000850E0001 | 192.168.16.129 | Color Printer | 2F NORTH |
| 102 | 0000850E0002 | 192.168.16.130 | MFP | 2F CENTRAL |
| 103 | 0000850E0003 | 192.168.16.131 | Printer 1 | 3F SOUTH |
| 104 | 0000850E0004 | 192.168.16.132 | Printer 2 | 1F ENTRANCE |
| 105 | 0000850E0005 | 192.168.16.133 | Scanner | 2F WINDOW SIDE |

FIG. 5

| IDENTIFICATION INFORMATION | URL ADDRESS |
|---|---|
| 192.168.16.129 | http://pc111/app/app.cgi?tid=192.168.16.129 |
| 192.168.16.130 | http://pc111/app/app.cgi?tid=192.168.16.130 |
| 192.168.16.131 | http://192.168.16.131 |
| ⋮ | ⋮ |

FIG. 6

```
From : "PC111"
To : printer-admin@foo.eanon.co.jp
Subject : [DEVICE ERROR]
Reply-to : net-admin@bar.eanon.co.jp
MIME-Version : 1.0
Content-type : text/plain ; charset=ISO-2022-JP ERROR HAS OCCURRED
  RIGHT COVER OF PRINTER IS OPEN
  CLOSE RIGHT COVER OF PRINTER AND THEN PRESS ON-LINE KEY
....

DEVICE NAME   : Color Printer
IP ADDRESS    : 192.168.16.129
MAC ADDRESS   : 0000850E0001
LOCATION      : 2F NORTH
URL ADDRESS   : http://pc111/app/app.cgi?tid=192.168.16.129
```

FIG. 8

From : "Color Printer"
To : printer-admin@foo.eanon.co.jp
Subject : [DEVICE ERROR]
Reply-to : net-admin@bar.eanon.co.jp
MIME-Version : 1.0
Content-type : text/plain ; charset=ISO-2022-JP ERROR HAS OCCURRED
  RIGHT COVER OF PRINTER IS OPEN
  CLOSE RIGHT COVER OF PRINTER AND THEN PRESS ON-LINE KEY

....

DEVICE NAME   : Color Printer
IP ADDRESS    : 192.168.16.129
MAC ADDRESS   : 0000850E0001
LOCATION      : 2F NORTH
URL ADDRESS   : http://192.168.16.129

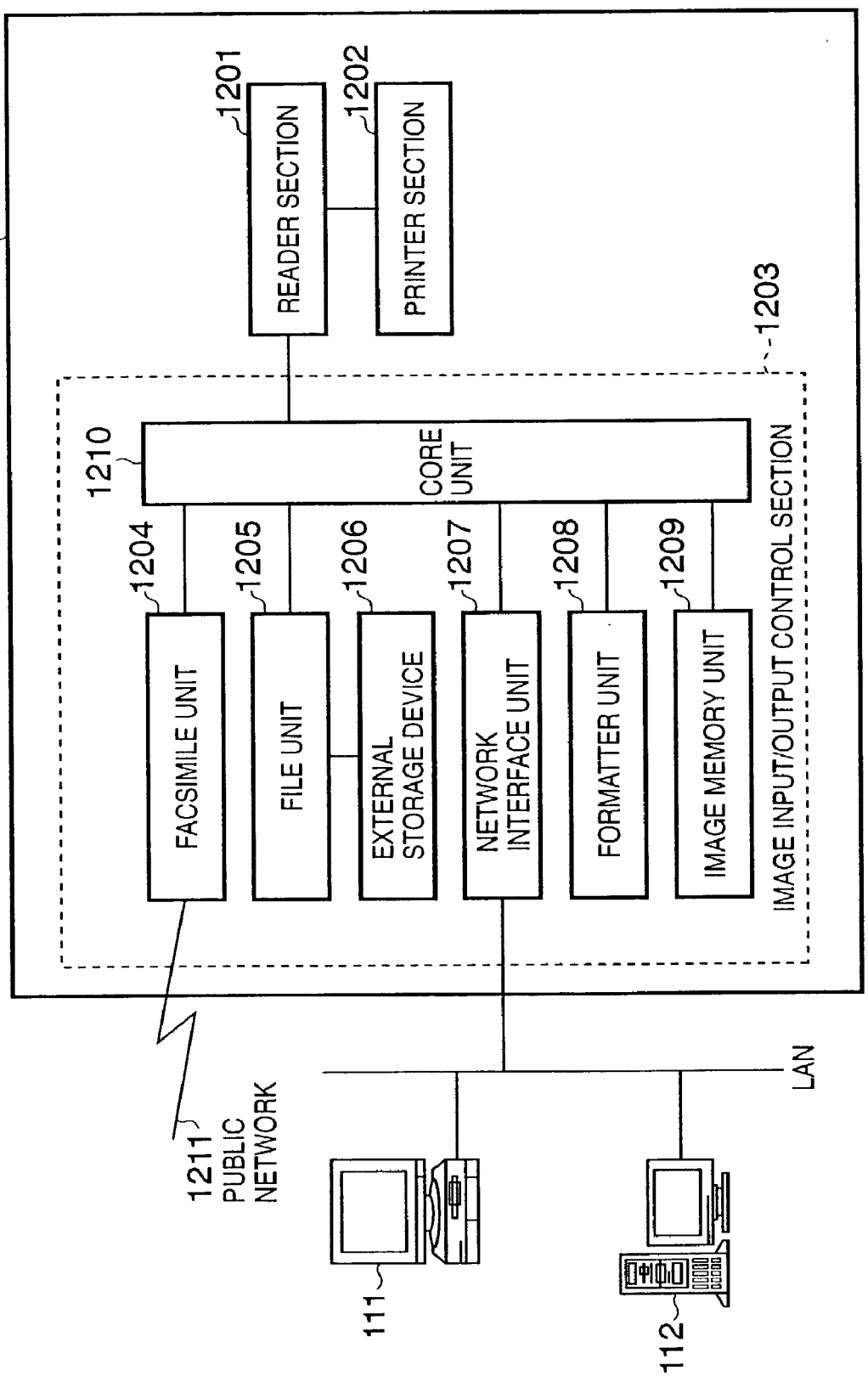

METHOD AND APPARATUS FOR MANAGING NETWORK DEVICES

FIELD OF THE INVENTION

This invention relates to a technique for managing various network devices connected to a computer network and, more particularly, to a method, apparatus, and program for managing network devices.

BACKGROUND OF THE INVENTION

In recent years, along with the progress of computer networks, various network devices have come into the market. In a network such as a LAN (Local Area Network) or the like, since a network device such as a printer or the like is normally set at a place physically separated from a computer, it is desired to manage the network device even from a remote place. As a protocol used in such management, a protocol called SNMP (Simple Network Management Protocol) is known.

SNMP is a protocol for managing networks such as a LAN and the like, and is prevalently used not only in networks based on TCP/IP (Transmission Control Protocol/Internet Protocol), but also in networks based on protocols other than TCP/IP.

Normally, in network management based on SNMP, the network is managed by accessing using SNMP an information database which is called an MIB (Management Information Base) and has a tree structure.

On the other hand, a directory service is provided as a method of efficiently finding and using various resources (printers, servers, scanners, and the like) on a network. The directory service is a telephone book associated with a network. As an example of the directory service, LDAP (Lightweight Directory Access Protocol) specified by RFC1777 and NDS (NetWare Directory Service) available from Novell, Inc. are known.

A conventional network device management system can search for network devices connected to the network, can display the states of network devices and various kinds of information set in the network devices, and can change those contents using SNMP/MIB or directory service. These kinds of information contain the product names of network devices, the names of network devices named by the user, network addresses such as MAC addresses and IP addresses, the locations of network devices, and the like.

A related art for reporting information associated with network devices to the user using an e-mail message will be examined below. According to this related art, if an error has occurred in a given network device, an e-mail message that describes the product name of that network device, the name on the network, the network address, location, and the like is delivered.

However, in the above related art, even when the user receives such e-mail message, he or she cannot intuitively recognize what kind of error has occurred.

It is, therefore, an object of the present invention to provide a method and apparatus for managing network devices, which can make the user intuitively recognize the current state of a network device in which an error has occurred.

In the present invention, for example, a Web technique is used to make the user intuitively recognize information. More specifically, the present invention provides a Web application that displays, on a Web browser of a PC, a list of network devices connected to the network, the states of the network devices, various kinds of information set in the network devices, and the like. In this way, the user can easily intuitively recognize practical information associated with an error or the like.

With the aforementioned related art, the user is informed of occurrence of an error using an e-mail message, and also of practical information associated with that error using a Web application separately. In such case, the user recognizes occurrence of an error by reading the e-mail message, and launches a Web browser and manually designates a predetermined URL address to recognize the current state of the network device. If the URL address is unpublicized, the user cannot access a site unless he or she is reminded of the URL address from an administrator or the like, thus posing a problem in terms of immediacy of information. Furthermore, such method is inconvenient for the user since many manual operations are required (e.g., the user must launch e-mail software, launch the Web browser, key-input the URL address, and so forth).

It is another object of the present invention to provide a method and apparatus for managing network devices, which can solve the above problem, and sends a message indicating that an error has occurred in a network device, and including a site on the network, which provides detailed information associated with the error.

In other words, the user can easily recognize the URL address by this message even if he or she does not know the URL address. Using a link function of the URL address, the user can easily access a providing site designated by that URL address by clicking the URL address on an e-mail message using a pointing device, thus facilitating user's operations.

Information that is associated with a network device, and that the user wants, is not only error information. In addition, various kinds of information are present. Also, errors have various categories. In such case, a providing sites of each information is preferably changed in correspondence with kinds of information or for each information.

It is still another object of the present invention to inform the user of different providing sites in correspondence with kinds of information.

The information providing site need not be limited to an external PC different from the network device.

It is, therefore, yet another object of the present invention to provide a network device, which includes a Web server and provides a function of displaying the state of the network device and various kinds of information set in the network device on a Web browser of a PC.

SUMMARY OF THE INVENTION

Accordingly, it is an object of the present invention to provide a network device management apparatus for managing a network device connected to a network, comprising: a storage component tailored to store information about a providing site or saving site of information associated with the network device; a generation component tailored to acquire the information about the providing site or saving site from the storage component, and to generate an electrical message that contains the acquired information about the providing site or saving site; and a sending component tailored to send the electrical message generated by the electrical generation component to a predetermined address. With this arrangement, the user can detect the providing site of information associated with a network device via an electrical message, and can save labor for the subsequent required operations.

The aforementioned management apparatus may further comprise a providing component tailored to provide the information associated with the network device at the providing site or the like. Note that the providing component may comprise a Web application, Web server, or the like that provides the information associated with the network device in a format displayable on a Web browser. Of course, an information providing component equivalent to them may be used. With this arrangement, since information associated with a network device can be provided to the user using a prevalent Web technique, the user can intuitively recognize the state of the network device.

The aforementioned management apparatus may further comprise a monitoring component tailored to monitor an operating state of the network device. In this case, the providing component provides a monitoring result of the monitoring component.

The monitoring component may be mounted on the network device, or may be a second monitoring program which inquires a first monitoring program, that monitors errors on the network device, about the presence/absence of occurrence of errors in collaboration with the first monitoring program. The first monitoring program may run on a device other than the network device to be monitored.

Note that the information associated with the network device includes, e.g., information that indicates an operating state of the network device. Of course, the information associated with the network device may include other kinds of information such as the product name of the network device, the name of the network device named by the user, the network address such as the MAC address, IP address, or the like, the location of the network device, the specific contents of an error, advice for removing the error, and the like. With this arrangement, the user can recognize detailed information of the network device.

The storage component may store a plurality of pieces of information about the providing or saving site of the information associated with the network device. For example, each network device has a plurality of different operating states, all or some of which may be provided at different providing sites. In such case, the storage component can store information about the providing site of information of each operating state. For example, the first URL address may designate a providing site of information about out of paper, the second URL address may designate a providing site of information about out of toner, and so forth. Therefore, various kinds of information associated with the states of the network device can be provided at different sites. Since the providing sites are distributed at a plurality of locations, the load on the network process can also be distributed.

The storage component may store a table, list, or database which describes correspondence between the plurality of pieces of information about the providing sites or saving sites of the information associated with the network device, and the plurality of operating states of the network device. These are merely examples, and any other arrangements may be used as long as the location of corresponding information can be output in response to input information associated with the operating state of the network device.

Furthermore, the management apparatus may comprise a search component tailored to search for information about a providing site or saving site of information corresponding to a given operating state of the network device on the basis of that operating state, and the electrical generation component may generate an electrical message that contains the information about the providing site or saving site found by the search component. For example, the aforementioned database may be searched for a corresponding URL address using an error code as a search key, and the found URL address is sent to the user via an electrical message.

Note that the information about the providing site or saving site of the information associated with the network device is an address of a site that provides the information associated with the network device on the network. For example, the URL address, IP address, and the like may be used. Of course, when other standards are used, other kinds of address information are used. That is, any other kinds of information may be used in place of the address information as long as they can help the user in accessing information associated with the network device.

Furthermore, the management apparatus may be mounted inside the network device. Of course, the management apparatus may be formed by an information processing apparatus externally connected to the network device.

The providing component may be formed by an information processing apparatus externally connected to the network device.

With the above arrangement, upon receiving an electrical message indicating that an error has occurred in a network device, the user can access a Web application, that provides the information and state of the network device, with reference to the URL address attached to the electrical message, and can acquire required information. Furthermore, the user can easily identify if an error has occurred in the network device, and can immediately recognize the current state of the network device in which the error has occurred.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows an example of a URL management table that specifies the relationship between identification information of network devices and corresponding URL addresses;

FIG. 6 shows an example of an e-mail message according to the embodiment of the present invention;

FIG. 8 shows an example of an e-mail message according to the embodiment of the present invention;

FIG. 12 shows the exemplary block diagram of a printer applied to the embodiment of the present invention.

DETAILED DESCRIPTION OF THE PREFERRED EMBODIMENTS

Preferred embodiments of the present invention will now be described in detail in accordance with the accompanying drawings.

First Embodiment

Figure 1:
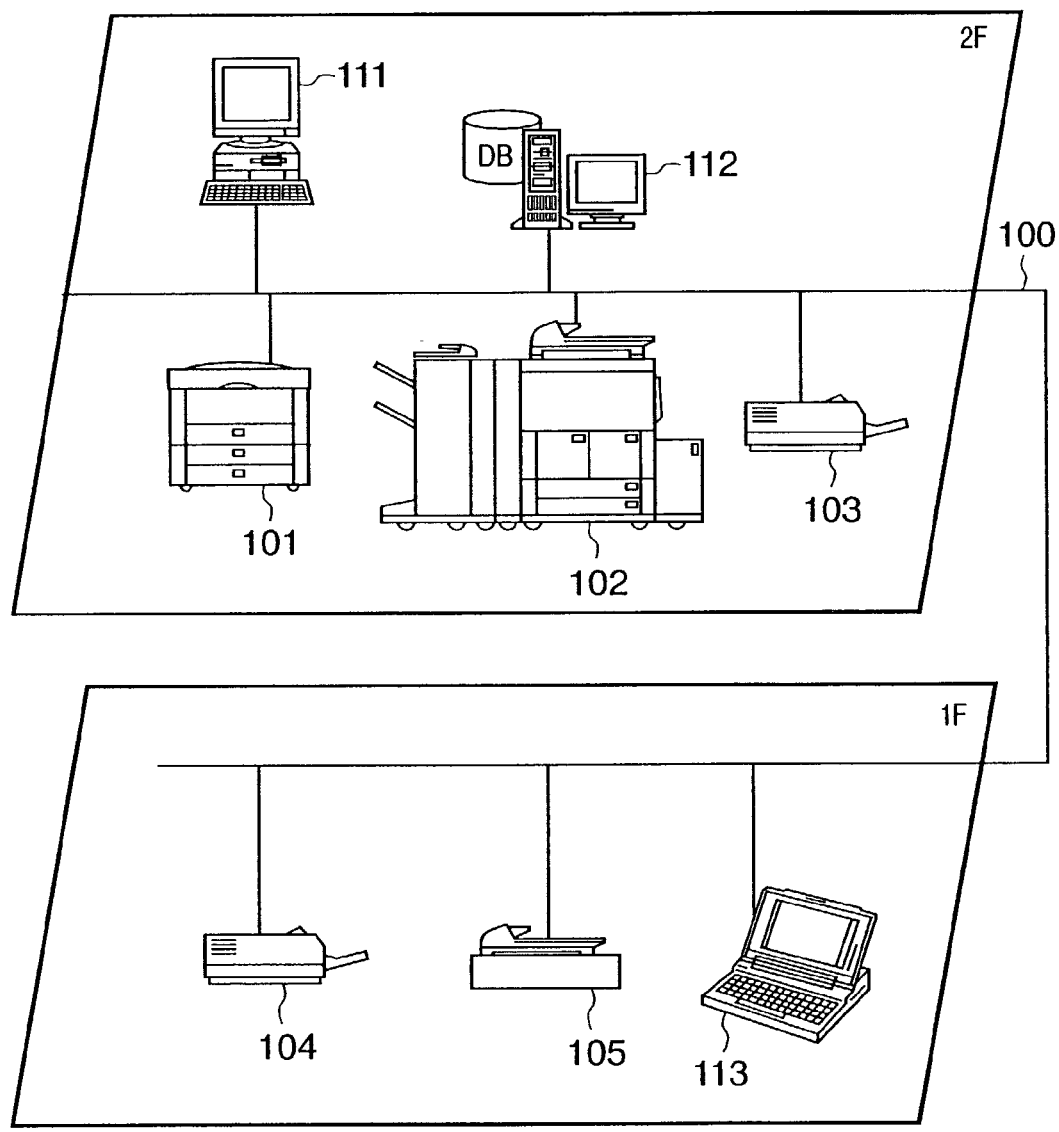
FIG. 1 is a diagram showing the arrangement of a network to which a network device management system according to an embodiment of the present invention can be applied.

A preferred embodiment of the present invention will be described below with reference to the accompanying drawings. FIG. 1 shows an example of the arrangement of a network to which a network device management system of this embodiment can be applied.

Referring to FIG. 1, reference numeral 101 denotes a color printer; 102, an MFP (Multi Function Peripheral; which is basically a copying machine, and can also be used as a network printer); 103 and 104, monochrome printers; and 105, a scanner connected to a network. These devices are merely examples of network devices, and the preferred embodiments can be applied to network devices other than these examples. That is, this embodiment can manage every network devices as long as they can be connected to the network.

A network device management program (to be simply referred to as a management program hereinafter) according to this embodiment may run on these network devices or on external PCs 111 and 113. When the management program runs on the network devices, it may run on each individual network device or only on some network devices. In the latter case, when the management program runs on arbitrary one network device and manages not only the self device but also other network devices, the network devices which have no management program can be managed. The principal function of the management program is to inform of errors in the network devices 101 to 105 using an e-mail message.

Reference numerals 111 and 113 respectively denote a desktop PC and notebook PC. On these PCs, the management program according to this embodiment can run to acquire error states of the network devices 101 to 105, and to inform of errors in the network devices 101 to 105 using an email message. Reference numeral 112 denotes a PC which serves as a mail server such as SMTP (Simple Mail Transfer Protocol) or the like, and forwards e-mail messages sent from the network devices 101 to 105, desktop PC 111, and notebook PC 113 to designated addresses. All these devices are network-connected via a LAN 100.

Figure 2:
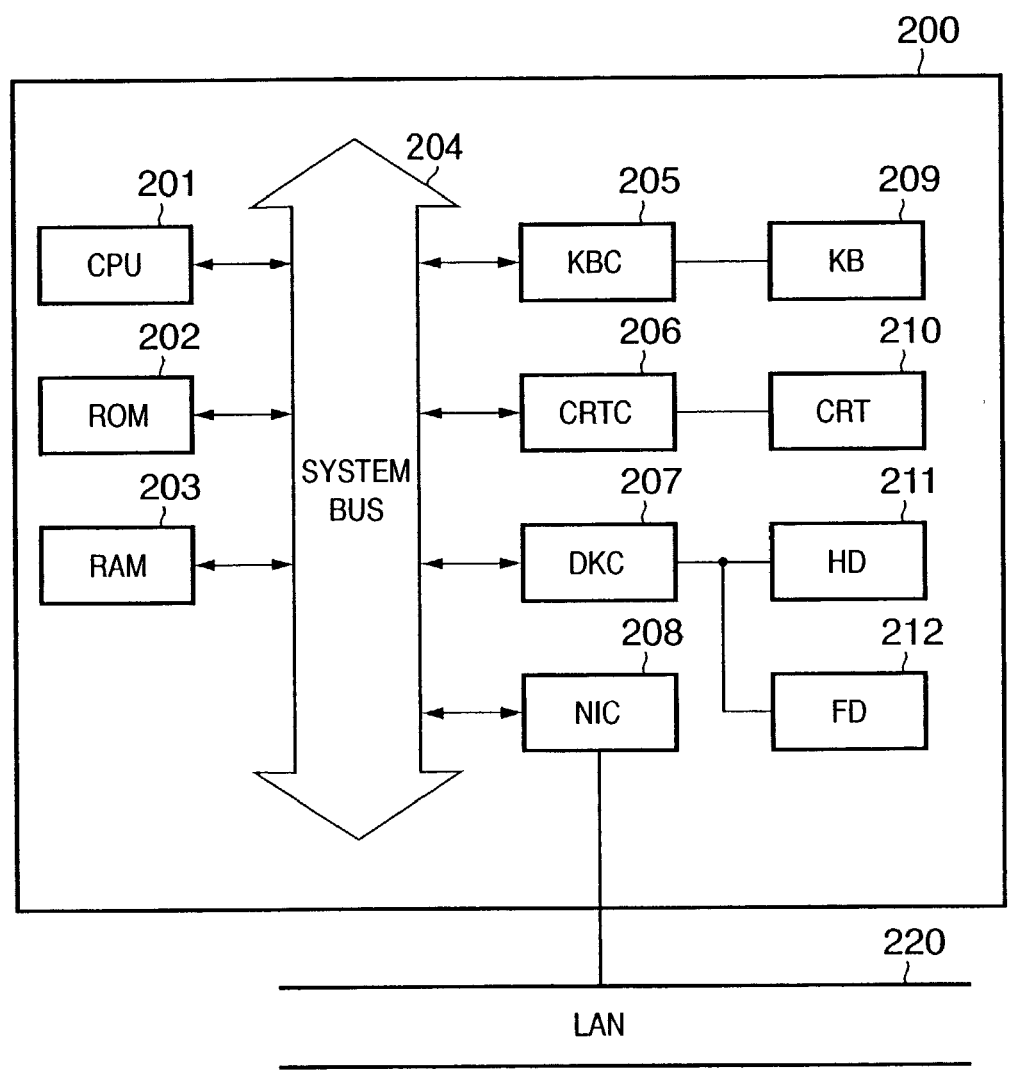
FIG. 2 is a block diagram showing the internal arrangement of a general personal computer.

FIG. 2 shows an example of the internal arrangement of a general personal computer. Reference numeral 200 denotes a PC on which the management program can run, and which is equivalent to the PC 111 or 113 shown in FIG. 1. The PC 200 comprises a CPU 201 that executes a management program, which is stored in a ROM 202 or hard disk (HD) 211, or is supplied from a flexible disk drive (FD) 212, and systematically controls network devices connected to a system bus 204.

Reference numeral 203 denotes a RAM which serves as a main memory, work area, and the like of the CPU 201. Reference numeral 205 denotes a keyboard controller (KBC), which controls instruction inputs from a keyboard (KB) 209, pointing device (not shown), and the like. Reference numeral 206 denotes a CRT controller (CRTC), which controls display on a CRT display (CRT) 210. Reference numeral 207 denotes a disk controller (DKC), which controls accesses to storage devices such as a CD-ROM (not shown), the hard disk (HD) 211, the flexible disk drive (FD) 212, and the like. The hard disk (HD) 211, flexible disk drive (FD) 212, and the like store a boot program, various applications, edit files, user files, a network management program, and the like. Reference numeral 208 denotes a network interface card (NIC), which is a communication device used to exchange data in two ways with network printers, other network devices, or other PCs via a LAN 220. In this embodiment, the LAN 220 is the same as the LAN 100 in FIG. 1.

Figure 3:
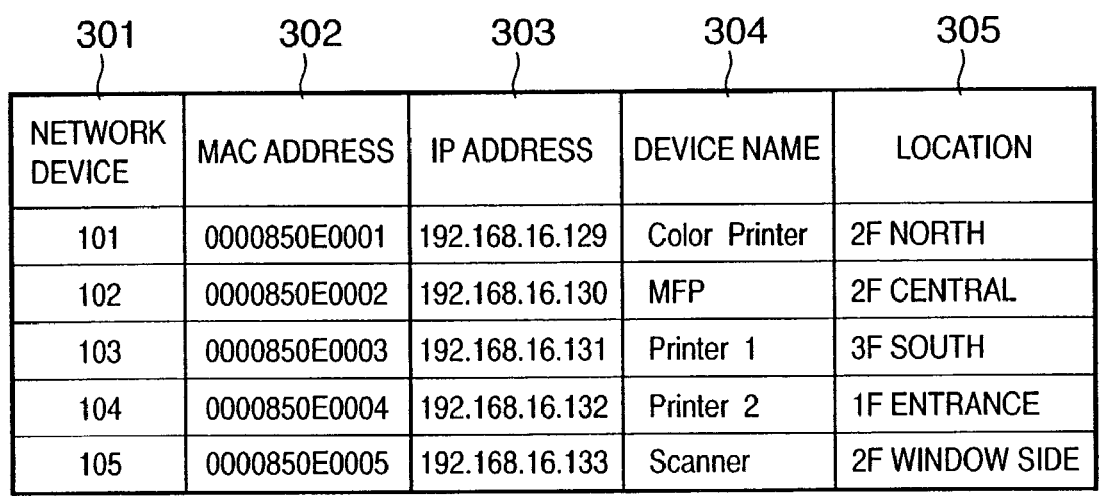
FIG. 3 shows data associated with network devices using a table format.

The arrangement and operation of the network device management system will be described below. FIG. 3 shows data associated with network devices, which are stored in the desktop PC, notebook PC 113, or network devices 101 to 105, in a table format.

MAC addresses (302), IP addresses (303), device names (304), and locations (305) are stored in correspondence with the network devices 101 to 105 in the column of network device (301).

Note that FIG. 3 merely shows examples of information. Hence, other kinds of additional information such as the product names of network devices and the like may be included.

An example of a network device management protocol that can be used in this embodiment will be explained. Some organizations for standardization have standardized management protocols so far. For example, ISO (International Organization for Standardization) has proposed a versatile reference framework called an OSI (Open Systems Interconnection) model. The OSI model of a network management protocol is called CMIP (Common Management Information Protocol). CMIP is a common network management protocol mainly used in Europe.

In the U.S.A., a variation of CMIP called SNMP (Simple Network Management Protocol) is used as a network management protocol with higher commonality. Please refer to M. T. Rose, Takeshi Nishida (TR), "Practical Management: An introduction to Management of TCP/IP-based Internets", Toppan Printing. Co., Ltd., Aug. 20, 1992 (First Edition) for SNMP. According to the SNMP network management technique, a network management system includes at least one network management station, nodes to be managed, agents equipped on nodes to be managed, and a network management protocol that the network management station and agents use to exchange management information. The user can acquire and change data on the network via communications with agent software on each node to be managed using network device management software on the network management station.

The agent is software which runs as a background process for each target device. When the user requests a device on the network to send management data, management software sets object identification information in a management packet or frame, and outputs that packet or frame to a target agent. The agent interprets that object identification information to extract data corresponding to the object identification information, sets that data in a packet, and sends the packet back to the user. In some cases, a corresponding process may be called to extract data.

The agent holds data associated with its status in the form of a database. This database is called an MIB (management information base). The MIB has a tree data structure, and all nodes are uniquely assigned numbers. This MIB structure is called an SMI (Structure and Identification of Management Information), and is specified by RFC1155 "Structure and Identification of Management Information for TCP/IP-based Internets".

The agent is installed on a network board used to connect a printer to the network or in the printer. In this manner, the printer can be set as a device to be managed by the network device management software. The user can acquire information of the printer to be controlled and can change status data using the network device management software. More specifically, the user can acquire a character string displayed on a liquid crystal display of the printer, and can change a default paper feed cassette.

Figure 4:
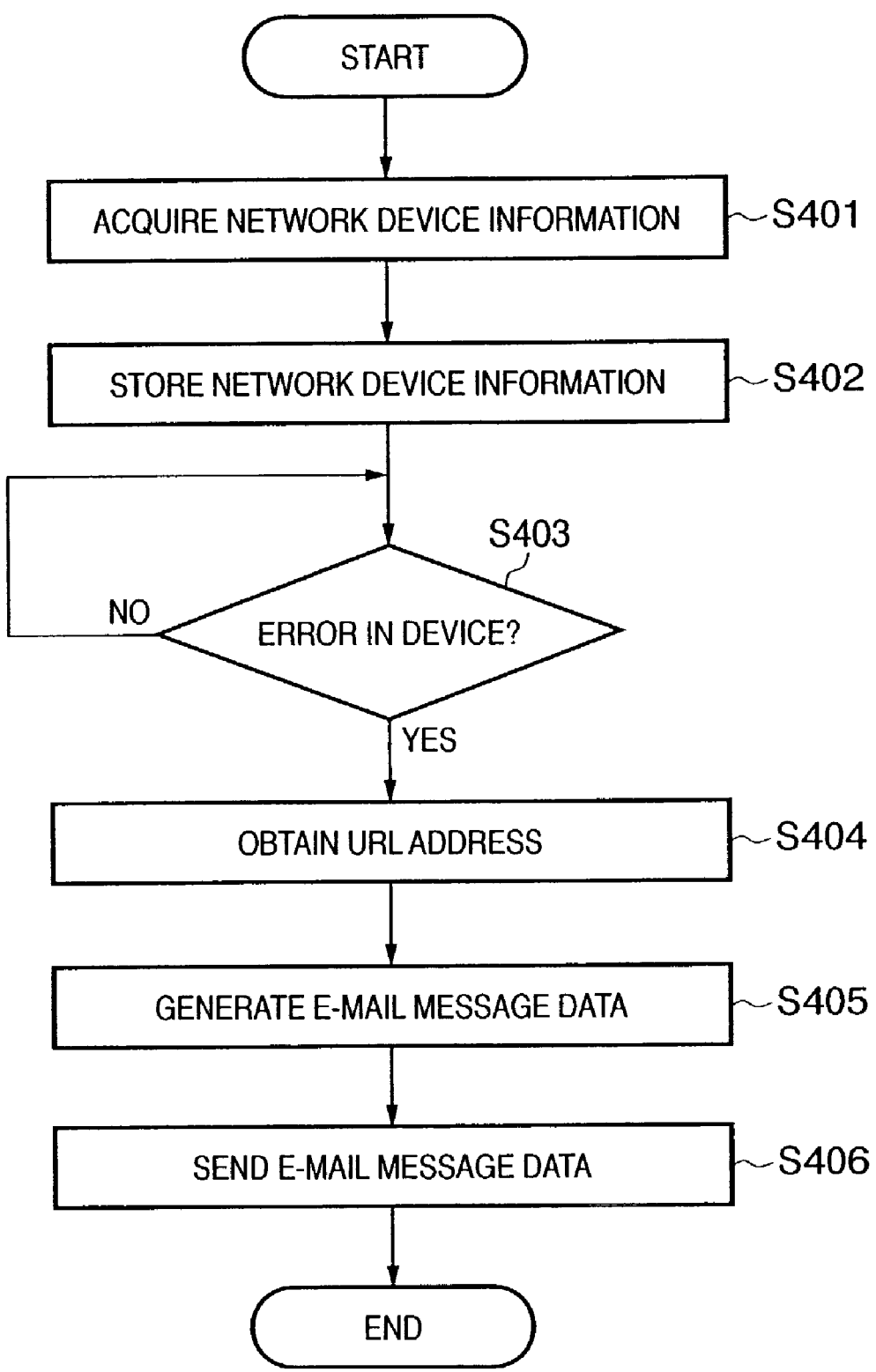
FIG. 4 is a flow chart of a management program according to the first embodiment.

FIG. 4 is a flow chart for explaining an example of the operation of the desktop PC 111 or notebook PC 113. A series of processes are decided and executed by the CPU 201 in the desktop PC 111 or notebook PC 113 in terms of hardware. When the management program is installed in a network device, that management program runs on the network device.

When the desktop PC 111 or notebook PC 113 is started, information associated with each network device, which includes a MAC address, IP address, device name, location, and the like is acquired from each of the network devices 101 to 105 via the NIC 208 in step S401.

An example of this acquisition process will be explained. The desktop PC 111 or notebook PC 113 requests each of the network devices 101 to 105 to send information associated with each network device, which includes a MAC address, IP address, device name, location, and the like, using SNMP/MIB, and each of the network devices 101 to 105 sends back information in each row of FIG. 3. More specifically, a GetRequest packet for MIB objects associated with the aforementioned IP address, and the like is broadcasted using an SNMP search module. Upon receiving the GetRequest packet, each network device stores requested MIB object values in a GetResponse packet, and sends it back. The SNMP search module receives this GetResponse packet, and acquires the information associated with each network device, which is stored in the packet, and includes a MAC address, IP address, device name, location, and the like.

In step S402, the information associated with each network device, which includes a MAC address, IP address, device name, location, and the like, is stored in the RAM 203. Of course, this information may be stored in the HD 211 or the like as another storage device.

A device monitoring module monitors in step S403 if an error has occurred in any network device. More specifically, a network device is specified from a table stored in the RAM 203, and a GetRequest packet for acquiring an MIB object which indicates the state of that device is sent, thus sending an inquiry to that network device. Or it is checked if a message that informs of occurrence of an error has been received from any network device. Upon receiving such message, the CPU 201 stores the message in a storage device such as the RAM 203, HD 211, or the like. A GetResponse packet is received from each device to be managed, and the MIB object value contained in the received GetResponse packet is checked. As a result, if it is determined that an error has occurred in one network device, the flow advances to step S404.

In step S404, the URL address of a Web application that can display the information and state of the network device in which an error has occurred is acquired. More specifically, each network device sends identification information that aids in specifying that network device such as an IP address or the like together with information associated with an error in response to an inquiry of an error. A table shown in FIG. 5 is looked up based on this identification information to acquire a corresponding URL. Note that the table shown in FIG. 5 is pre-stored in a storage device such as the RAM 203, HD 211, or the like.

FIG. 5 is a table showing the relationship between the identification information of network devices and corresponding URLs. Of course, the data format is not limited to a table. That is, any other data formats may be used as long as a URL corresponding to the identification information of each network device can be acquired. In the example shown in FIG. 5, the IP address of each network device is adopted as identification information 501. Of course, the name of a network device on the network may be used. A URL 502 is the address that indicates a site (Web application) which provides information associated with the corresponding network device. The URL addresses can be arbitrarily named, as shown in FIG. 5.

In step S405, e-mail message data which is to be sent to an address set in advance to inform of occurrence of an error in a given network device is generated. More specifically, the information associated with the corresponding network device, which is stored in the RAM 203 in step S402, and includes a MAC address, IP address, device name, location, and the like, and the URL address of the Web application acquired in step S404 are referred to, and the contents of an error that has occurred in the network device detected in step S403 are converted into an error message, thus generating e-mail message data. This e-mail message data may be generated by the device monitoring module or a dedicated e-mail message data generation module.

For example, when a template for an e-mail message is pre-stored in the HDD 211 or the like, and only the device name, URL address, and the like are added or modified, as shown in FIG. 6, e-mail message data for error information can be relatively easily generated.

In step S406, an e-mail control module sends the e-mail message data generated in step S405 to the mail server 112.

FIG. 6 shows an example of e-mail message data to be sent. The e-mail message data shown in FIG. 6 is attached with the URL address of the Web application. This Web application runs on the desktop PC 111 or notebook PC 113, and displays the information and state of a network device in which an error has occurred.

Upon receiving this e-mail message in practice, the user can directly launch the Web application, that can display the information and state of a network device in which an error has occurred, from a Web browser by clicking the URL address on the received e-mail message using a URL link function as one of functions of a mailer.

Second Embodiment

In this embodiment, a management program runs in some or all of the network devices 101 to 105. In this case, some or all of the network devices 101 to 105 independently store information shown in respective rows of FIGS. 3 and 5. If an error has occurred in one of these network devices, a management program which manages that network device generates e-mail message data. The management program may run on the network device in which an error has occurred or may run on other network devices. That is, a management program which manages the network device in which an error has occurred executes a management process. Subsequently, the network device in which an error has occurred sends e-mail message data to a mail (SMTP)

server. For the sake of simplicity and easy understanding of the invention, a description common to the first embodiment may be omitted.

FIG. 12 is a block diagram showing an example of the arrangement of a print system of the preferred embodiments. Referring to FIG. 12, a hybrid machine 102 (image forming apparatus) as a preferred example of a network device integrates scanner, printer, copy, and facsimile functions, and is connected to a network server 112 and host computer 111 via a network. Furthermore, the hybrid machine 102 is connected to another communication device via a public network 1211. Note that the hybrid machine 102 is not limited to the illustrated example, but a digital copying machine, printer with a copy function, or the like may be used. Also, the number of peripheral devices connected to the network is not limited to the illustrated example.

The hybrid machine 102 mainly comprises a reader section 1201, printer section 1202, and image input/output control section 1203. The reader section 1201 is connected to the printer section 1202 and image input/output control section 1203, reads a document image, and outputs the read image data to the printer section 1202 or image input/output control section 1203. The printer section 1202 prints image data output from the reader section 1201 and image input/output control section 1203 on a print sheet. The image input/output control section 1203 is connected to an external network or public network to input/output image data. Also, the image input/output control section 1203 stores the use state when the user uses the hybrid machine 102. Furthermore, the image input/output control section 1203 analyzes and controls jobs (print command and the like) coming from the host computer 111 connected to the network.

The image input/output control section 1203 comprises a facsimile unit 1204, file unit 1205, network interface unit 1207, PDL formatter unit 1208, and core unit 1210. The facsimile unit 1204 is connected to the core unit 1210 and the public network. The facsimile unit 1204 expands compressed image data received from the public network, and sends the expanded image data to the core unit 1210. Also, the facsimile unit 1204 compresses image data sent from the core unit 1210, and sends the compressed image data onto the public network via a public line. The file unit 1205 is connected to the core unit 1210 and an external storage device 1206. The file unit 1205 compresses image data sent from the core unit 1210, and stores the compressed image data in the external storage device 1206, which can comprise a hard disk or the like, together with a keyword used to search for that image data. Furthermore, the file unit 1205 searches the external storage device 1206 for compressed image data on the basis of a keyword sent from the core unit 1210, reads out and expands that compressed image data, and sends the expanded image data to the core unit 1210.

The network interface unit 1207 serves as an interface between the host computer 111 and network server 112 which are connected via an external network, and the core unit 1210. Reception of job control data from the host computer 111 and sending of image data or the like to the host computer 111 are done via the network interface unit 1207. For example, the job control data includes a job control command which is sent together with PDL data. More specifically, a given job control command controls to print out image data obtained by rasterizing PDL data on print sheets, and to sort and staple exhausted sheets. The network interface unit 1207 forms and holds a database called MIB (Management Information Base). Furthermore, the network interface unit 1207 communicates with the host computer 111 on the network via SNMP (Simple Network Management Protocol) to manage the printer section 1202.

The formatter unit 1208 is connected to the core unit 1210, and rasterizes PDL data sent from the host computer 111 to image data that the printer section 1202 can print.

An image memory unit 1209 temporarily stores information from the reader section 1201, and information sent from the host computer 111 or the like via the network interface unit.

The core unit 1210 controls data and the like that flow among the aforementioned reader section 1201, facsimile unit 1204, file unit 1205, network interface unit 1207, and PDL formatter unit 1208, analyzes job control data, and stores information such as the use state of the user, copy count, print count, scan count, and the like. The host computer 111 (113) comprises a personal computer or workstation (PC/WS), and the network server 112 is a server for controlling the overall network.

Figure 7:
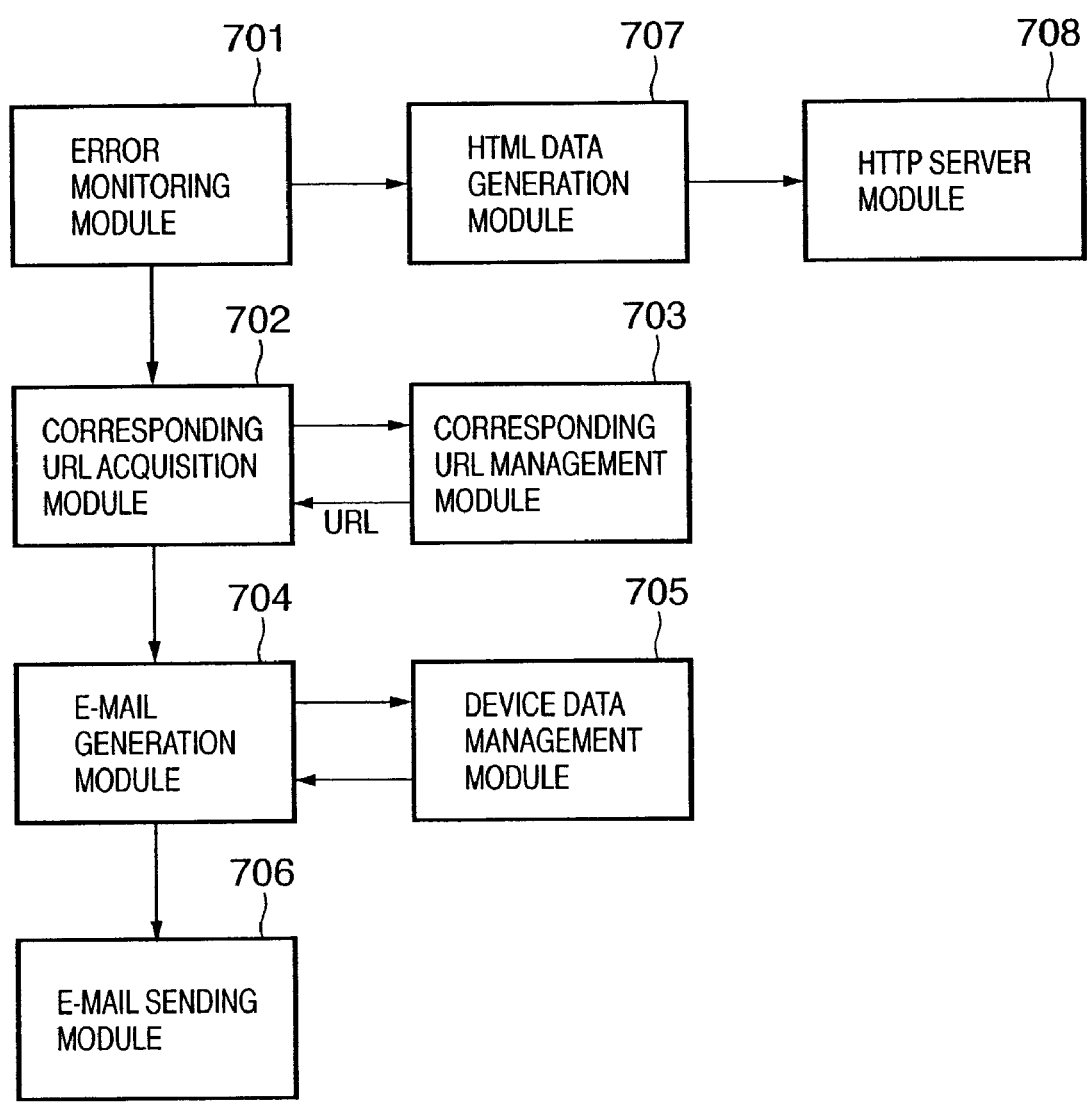
FIG. 7 is a block diagram showing an example of the module configuration of a management program according to the second embodiment.

FIG. 7 shows the module structure of the management program. Assume that modules 701 to 708 in FIG. 7 which implement the mechanism for managing network devices are stored in the external storage device 1206. Respective modules are read out from the external storage device 1206, and are executed by the core unit 1210. An error monitoring module 701 monitors if an error has occurred in each network device. For example, if an error has occurred, the error monitoring module 701 outputs an error code and the like which indicates the type of error to other modules 702 and 707.

Upon receiving the error code from the error monitoring module 701, a corresponding URL acquisition module 702 accesses a device data management module 705 to acquire identification information (IP address or the like) of the network device, and requests a URL address corresponding to the acquired identification information of a corresponding URL management module 703. The corresponding URL management module 703 searches a URL management table (FIG. 5) stored in the HDD 211 or the like for a URL address of a Web application that provides the state of the network device, and passes the URL address to the corresponding URL acquisition module 702 as a search result.

The corresponding URL acquisition module 702 passes the acquired URL address and error code to an e-mail generation module 704. The e-mail generation module 704 requests information associated with the network device (e.g., IP address and the like) of the device data management module 705. The device data management module 705 acquires data such as a MAC address, IP address, device name, location, and the like from a table shown in FIG. 3, and passes them to the e-mail generation module 704.

The e-mail generation module 704 reads out a template of e-mail message data corresponding to the error code from the HDD 211, adds the information associated with the network device and URL address to the template to generate e-mail message data, and passes that e-mail message data to an e-mail sending module 706. Upon receiving the e-mail message data, the e-mail sending module 706 sends the e-mail message data to an SMTP server. With the aforementioned arrangement, the user receives an e-mail message that contains the URL address.

When a network device provides a Web application, the following process is done. Upon receiving the error code from the error monitoring module 701, an HTML data generation module 707 generates HTML data that contains a message corresponding to the error code. When the user who received the aforementioned e-mail message accesses the URL address described in the e-mail message, an HTTP server module 708 sends the HTML data generated by the HTML data generation module to the user. In this way, the user can display the HTML data on the Web browser, and can intuitively recognize the device state.

Of course, the HTTP server module 708 and HTML data generation module 707 may run on another network device or an external PC. In either case, since the user can receive an e-mail message that contains the URL address, he or she can easily access a network device or PC that provides information of the network device.

FIG. 8 shows an example of e-mail message data to be sent. The e-mail message data shown in FIG. 8 is generated when a Web application runs in each of the network devices 101 to 105. Upon receiving this e-mail message in practice, the user can directly launch the Web application, that can display the information and state of a network device in which an error has occurred, from the Web browser by clicking the URL address on the received e-mail message using a URL link function as one of functions of a mailer.

Third Embodiment

Figure 9:
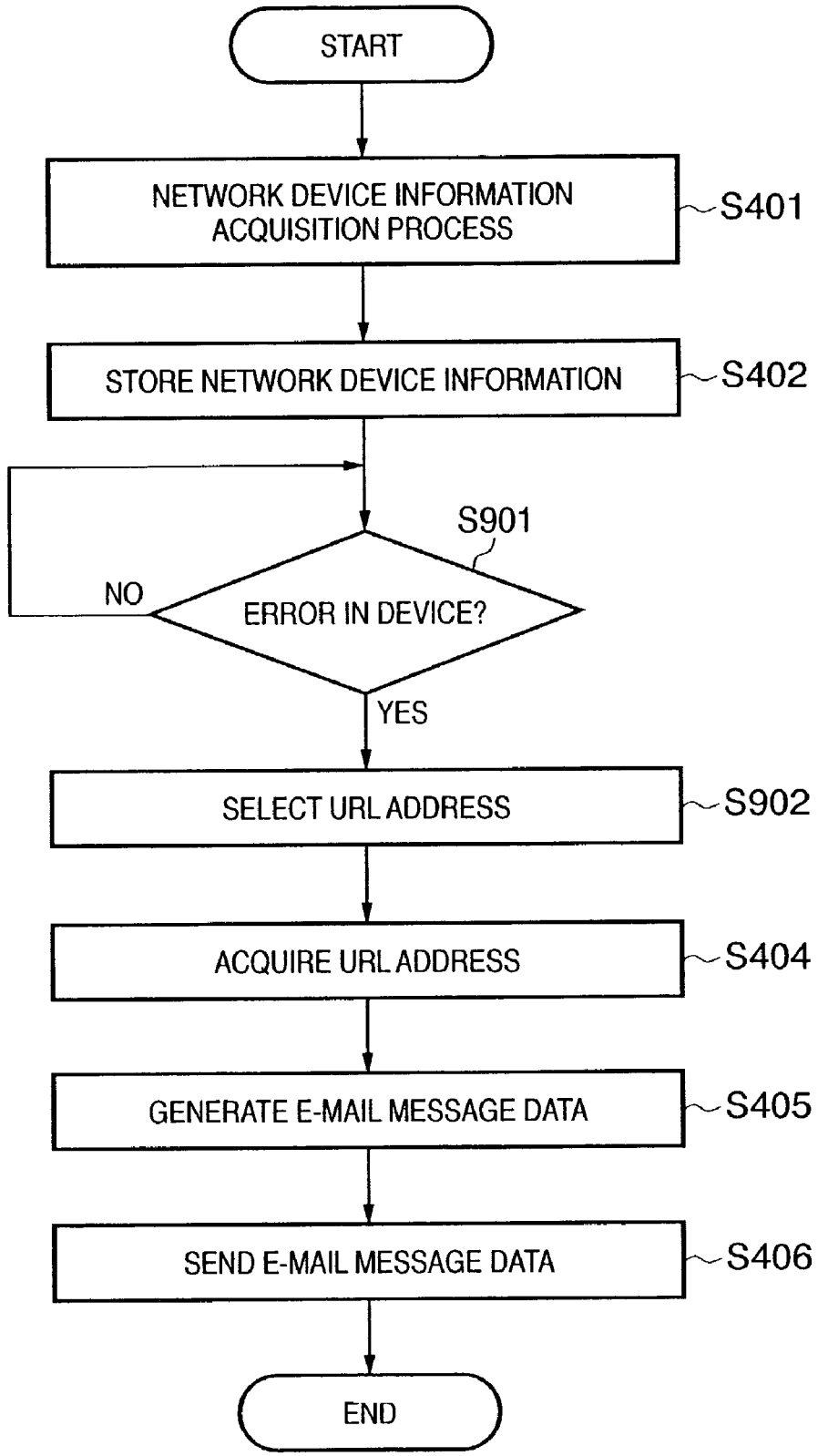
FIG. 9 is a flow chart of a management program according to the third embodiment.

In this embodiment, different URL addresses are provided in correspondence with the categories of errors that have occurred in network devices. FIG. 9 is a flow chart of this embodiment. Note that the same step numbers denote processes nearly common to those in the flow chart shown in FIG. 4, and a description thereof will be omitted.

It is monitored in step S901 if an error has occurred in each network device. If an error has occurred in a given network device, an error category is specified, and the flow advances to step S902.

In step S902, a URL address of a Web page corresponding to the error category is selected using a database that describes correspondence between the error categories and URL addresses, and is stored in the RAM 203.

Figure 10:
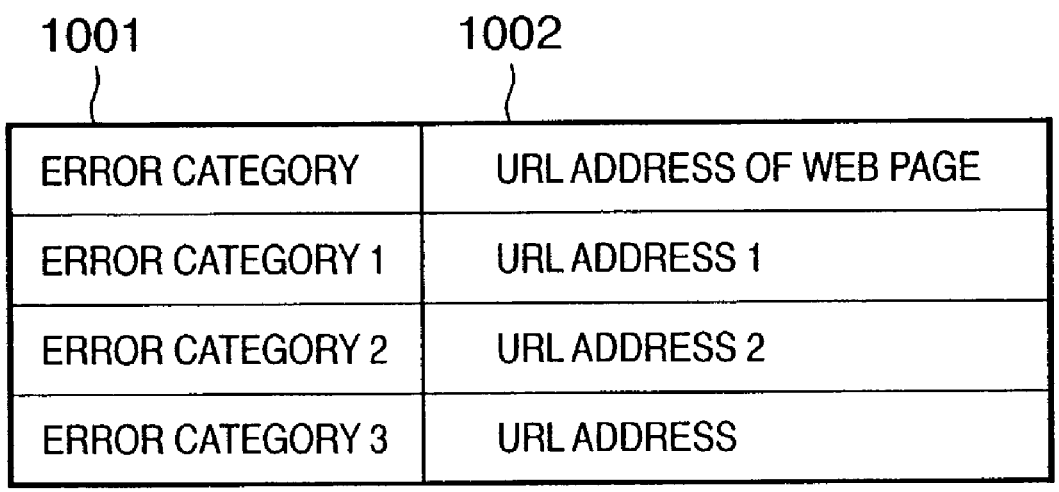
FIG. 10 shows an example of a URL management table that specifies the relationship between error categories and corresponding URL addresses.

FIG. 10 shows the correspondence between the error categories and URL addresses of Web pages in a table format. This table stores URL addresses (1002) of Web pages in correspondence with error categories (1001).

For example, the following error categories can be defined: deficient states of expendables such as paper, toner, ink, and the like (error category 1), service call error (error category 2), normal error (error category 3) that the user can recover, and the like. As URL addresses corresponding to those error categories, a URL address (URL address 1) for placing orders of expendables, a URL address (URL address 2) for service call of a vendor of the network device, a URL address (URL address 3) of a Web application that can display the information and state of the network device in which an error has occurred, and the like can be designated. The database shown in FIG. 10 may be fixedly held in the desktop PC 111 or notebook PC 113 or may be edited by the user. In step S404, the URL address selected in step S902 is acquired from the RAM 203.

In step S405, the device information such as the MAC address and the like, which is stored in the RAM 203 in step S402, and the URL address acquired in step S404 are referred to, and the error category detected in step S901 is converted into an error message, thus generating e-mail message data to be sent to an address which is set in advance.

In step S406, the e-mail message data generated in step S405 is sent to the mail (SMTP) server 112.

A case will be briefly explained by quoting the description of the second embodiment wherein the management program of this embodiment runs on a network device. Upon receiving an error code that represents an error category from the error monitoring module 701, the corresponding URL acquisition module 702 requests a URL address corresponding to the error code of the corresponding URL management module 703. The corresponding URL management module 703 searches a URL management table (FIG. 10) stored in the HDD 211 or the like for a URL address of a Web application that provides the state of the network device, and passes the URL address to the corresponding URL acquisition module 702 as a search result. The subsequent process is the same as that described above.

According to this embodiment, with the above arrangement, different URL addresses can be provided via e-mail messages in correspondence with different error categories.

The aforementioned management program may be executed by the PC 200 based on an externally installed program. In such case, the preferred embodiments can be applied to a case wherein the program is supplied to the PC 200 by loading an information group including that program onto the PC 200 from an external storage medium such as a CD-ROM, flash memory, flexible disk, or the like or via a network such as an e-mail message, PC communications, or the like.

Figure 11:
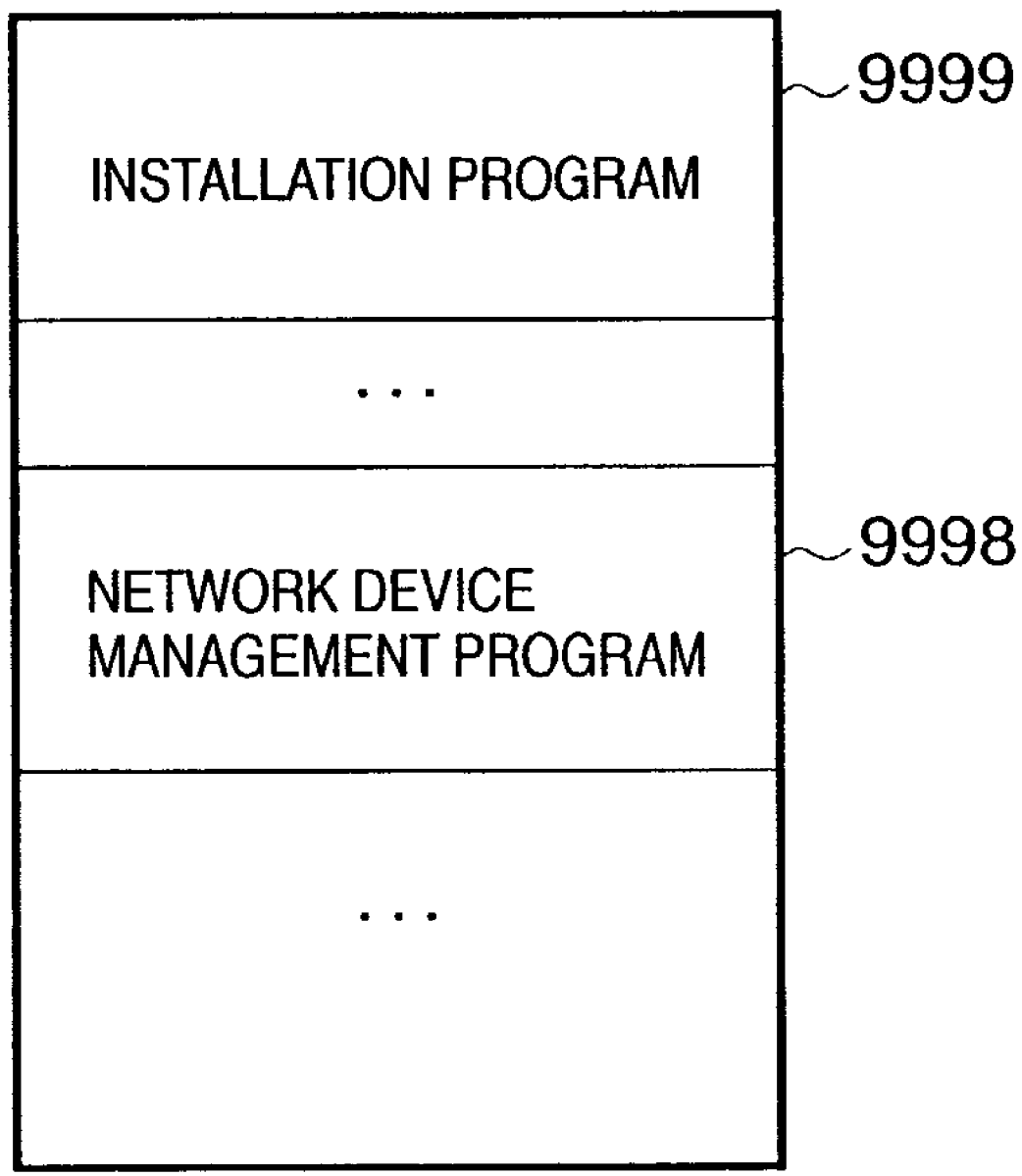
FIG. 11 shows the memory map of network device management software according to the embodiment of the present invention in a storage medium.

FIG. 11 shows the memory map of a CD-ROM as an example of the storage medium. Reference numeral 9999 denotes an area that stores an installation program. Reference numeral 9998 denotes an area that stores a network device management program.

Upon installing the network device management program of the embodiment into the PC 200, the installation program stored in the area 9999 that stores the installation program is loaded onto the system, and is executed by the CPU 201. The installation program executed by the CPU 201 reads out the network device management program from the area 9998 that stores the network device management program, and stores it in the hard disk 211.

Note that the embodiments may be applied to either a system or integrated apparatus constituted by a plurality of devices (e.g., a host computer, interface device, reader, and the like), or an apparatus consisting of a single equipment.

The objects of the embodiments are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements novel functions of the embodiments, and the storage medium which stores the program code constitutes the embodiements.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS or the like running on the computer on the basis of an instruction of the program code.

Furthermore, the functions of the above-mentioned embodiments may be implemented by some or all of actual processing operations executed by a CPU or the like tailored in a function extension board or a function extension unit, which is inserted in or connected to the computer, after the program code read out from the storage medium is written in a memory of the extension board or unit.

Note that the present invention can be applied to a case wherein a program is delivered from a storage medium that records the program code of software which implements the functions of the aforementioned embodiments to the requesting party via a communication line such as PC communications.

As described above, according to the present invention, since an e-mail message which indicates that an error has occurred in a given network device contains information that indicates a providing site of detailed information, and is sent to the user, the user can easily access that information providing site based on the received e-mail message even when he or she does not know the information providing site in advance.

When information is provided using a Web technique, a URL address can contribute to a series of operations that make the user intuitively recognize information.

If an e-mail message that describes a URL address of an information providing site is sent, the user can access a desired site since a Web browser is launched by making one action to the URL address using a link function. In other words, the user's operability can be improved.

Also, the user can be informed of different providing sites for respective kinds of information, and information can be provided in a more complicated form.

When a Web application to be browsed can display the state of a network device, the user can immediately display the current state of the network device.

As many apparently widely different embodiments of the present invention can be made without departing from the spirit and scope thereof, it is to be understood that the invention is not limited to the specific embodiments thereof except as defined in the appended claims.

What is claimed is:

1. A server apparatus for managing at least one managed network device connected to a network, comprising:
   a storage component that stores location information indicating locations of providing sites that provide categorized operational state information associated with the managed network device and a status of the managed network device, wherein different information storage units corresponding to respective location information stored in the storage component store and provide different categorized operational state information, respectively;
   a generation component that generates an electrical message;
   a monitoring component that monitors status information of the managed network device by communicating with the managed network device;
   a determination component that determines whether a change in the operational state of said managed network device has occurred in accordance with the status information monitored by said monitoring component;
   a specifying component that specifies a category of the monitored status information;
   a creating component that creates categorized state information according to the specified category;
   an acquiring component that acquires one of the corresponding location information from among the plurality of different location information stored in said storage component based on the specified category, and that provides the acquired location information to said generation component; and
   a sending control component that controls a process of sending the electrical message generated by said generation component to a predetermined address,
   wherein said acquiring component acquires the location information from said storage component when said determination component determines that a change of operational state of said managed network device has occurred, and the generation component generates the electrical message so as to contain the acquired location information associated with the categorized state information of the managed network device when it is determined by the determination component that a change in the operational state has occurred, and
   wherein the electrical message is sent by the sending control component to a user's computer corresponding to the predetermined address such that the location information can be used by a displaying application in the user's computer to acquire the categorized state information related to the managed network device from the providing site corresponding to the location information.

2. The server apparatus according to claim 1, further comprising a providing component that provides the operational state information associated with the managed network device stored at the providing site.

3. The server apparatus according to claim 2, wherein said providing component comprises a Web application that provides the operational state information associated with the managed network device in a format displayable on a Web browser.

4. The server apparatus according to claim 2, wherein said providing component comprises a Web server that provides the operational state information associated with the managed network device in a format displayable on a Web browser on a display screen of the user's computer.

5. The server apparatus according to claim 2, wherein said providing component is formed by an information processing apparatus externally connected to the managed network device.

6. The server apparatus according to claim 1, wherein the operational state information associated with the managed network device includes information that indicates an operating state of the managed network device.

7. The server apparatus according to claim 1, wherein said storage component stores a table, list, or database which describes a correspondence between a plurality of pieces of location information, and a plurality of operating states of the managed network device.

8. The server apparatus according to claim 1, further comprising a recognition component that recognizes the location information corresponding to a given operating state of the managed network device on the basis of that operating state, and wherein said generation component generates an electrical message that contains the location information about a providing site corresponding to the location information recognized by said recognition component.

9. The server apparatus according to claim 1, wherein the location information is a network address of a site that provides information associated with the managed network device on the network.

10. The server apparatus according to claim 9, wherein the network address is a URL address.

11. The server apparatus according to claim 9, wherein the network address is an IP address.

12. The server apparatus according to claim 1, wherein said server apparatus for managing the managed network device is mounted in a network device.

13. The server apparatus according to claim 1, wherein said server apparatus for managing the managed network device is formed by an information processing apparatus externally connected to the network device.

14. The server apparatus according to claim 1, wherein the managed network device is a printer.

15. The server apparatus according to claim 1, wherein the electrical message is an e-mail message.

16. A method performed by a server apparatus for managing at least one network device connected to a network, comprising the steps of:
   storing, in a storage component of the server apparatus, location information indicating locations of providing sites that provide categorized operational state information associated with the managed network device and a status of the managed network device, wherein different information storage units corresponding to respective location information stored in the storage component store and provide different categorized operational state information, respectively;
   generating an electrical message;
   monitoring status information of the managed network device by communicating with the managed network device;
   determining whether a change in the operational state of said managed network device has occurred in accordance with the status information monitored by said monitoring step;
   specifying a category of the monitored status information;
   creating categorized state information according to the specified category;
   acquiring one of the corresponding location information from among the plurality of different location information stored in the storing step based on the specified category, and providing the acquired location information to the generating step when the determining step determines that a change of operational state of said managed network device has occurred; and
   sending the electrical message generated by the generating step to a predetermined address,
   wherein the electrical message is generated in the generating step so as to contain the acquired location information associated with categorized state information of the managed network device when it is determined in the determining step that a change in the operational state has occurred, and
   wherein the electrical message is sent by the sending step to a user's computer corresponding to the predetermined address such that the location information can be used by a displaying application in the user's computer to acquire the categorized state information related to the managed network device from the providing site corresponding to the location information.

17. The method according to claim 16, further comprising a step of providing the operational state information associated with the managed network device stored at the providing site.

18. The method according to claim 17, wherein the providing step provides the operational state information associated with the managed network device in a format displayable on a Web browser.

19. The method according to claim 17, wherein the providing step is executed by an information processing apparatus externally connected to the managed network device.

20. The method according to claim 16, wherein the operational state information associated with the managed network device includes information that indicates an operating state of the network device.

21. The method according to claim 16, wherein the acquiring step includes a step of obtaining the location information from a table, list, or database which describes correspondence between a plurality of pieces of location information, and a plurality of operating states of the network device.

22. The method according to claim 20, further comprising a step of recognizing the location information corresponding to a given operating state of the managed network device on the basis of that operating state, and
   wherein the generating step generates an electrical message that contains the location information about a providing site corresponding to the location information recognized in the recognition step.

23. The method according to claim 16, wherein the location information is a network address of a site that provides the information associated with the managed network device on the network.

24. The method according to claim 23, wherein the network address is a URL address.

25. The method according to claim 23, wherein the network address is an IP address.

26. The method according to claim 16, wherein said server is mounted in the managed network device.

27. The method according to claim 16, wherein said server comprises an information processing apparatus externally connected to the managed network device.

28. The method according to claim 16, wherein said server is comprised in a printer.

29. The method according to claim 16, wherein the electrical message is an e-mail message.

30. A computer readable storage medium on which is stored a computer readable program executed by a server for managing at least one managed network device connected to a network, said computer program comprising code for executing the steps of:
   storing, in a storage component of the server apparatus, location information indicating locations of providing sites that provide categorized operational state information associated with the managed network device and a status of the managed network device, wherein different information storage units corresponding to respective location information stored in the storage component store and provide different categorized operational state information, respectively;
   generating an electrical message;
   monitoring status information of the managed network device by communicating with the managed network device;
   determining whether a change in the operational state of said managed network device has occurred in accordance with the status information monitored by said monitoring step;
   specifying a category of the monitored status information;
   creating categorized state information according to the specified category;
   acquiring one of the corresponding location information from among the plurality of different location information stored in the storing step based on the specified category, and providing the acquired location information to the generating step when the determining step determines that a change of operational state of said managed network device has occurred; and
   sending the electrical message generated by the generating step to a predetermined address
   wherein the electrical message is generated in the generating step so as to contain the acquired location information associated with categorized state information of the managed network device when it is determined in the determining step that a change in the operational state has occurred, and wherein the electrical message is sent by the sending step to a user's computer corresponding to the predetermined address such that the location information can be used by a displaying application in the user's computer to acquire the categorized state information related to the managed network device from the providing site corresponding to the location information.

31. The computer readable storage medium according to claim 30, wherein the electrical message is an e-mail message.

* * * * *

UNITED STATES PATENT AND TRADEMARK OFFICE
CERTIFICATE OF CORRECTION

PATENT NO. : 7,266,601 B2 Page 1 of 2
APPLICATION NO. : 10/191547
DATED : September 4, 2007
INVENTOR(S) : Maekawa et al.

It is certified that error appears in the above-identified patent and that said Letters Patent is hereby corrected as shown below:

COVER PAGE:
Item (56) References Cited, "EP 8433268 A2* 5/1998" should be deleted as a duplicate; and "EP 1096724 A1* 5/2001" should be deleted as a duplicate.

COVER PAGE:
Item (56) OTHER PUBLICATIONS,
"J. Reilly, et al., "Enabling mobile network managers", Computer Networks And ISDN Systems, Nodh Holland Publishing, Amsterdam, NL, vol. 29, No. 8-13, Sep. 1, 1997, pp.1417-1428.*" should be deleted as a duplicate.

(57) ABSTRACT, Line 1, "A sever" should read -- A server --; and
Line 13, "address such tat" should read -- address such that --.

COLUMN 1:
Line 28, "SNMP" should read -- SNMP, --.

COLUMN 2:
Line 22, "sends" should read -- sending --;
Line 24, "on the network," should read -- on the network --; and
Line 36, "sites" should read -- site --.

COLUMN 5:
Line 28, "devices" should read -- device --;
Line 36, "on arbitrary" should read -- one arbitrary --;
Line 37, "one" should be deleted; and
Line 47, "email" should read -- e-mail --.

UNITED STATES PATENT AND TRADEMARK OFFICE
CERTIFICATE OF CORRECTION

PATENT NO. : 7,266,601 B2
APPLICATION NO. : 10/191547
DATED : September 4, 2007
INVENTOR(S) : Maekawa et al.

It is certified that error appears in the above-identified patent and that said Letters Patent is hereby corrected as shown below:

COLUMN 12:
Line 50, "embodiements." should read -- embodiments. --.

Signed and Sealed this

Twenty-fourth Day of June, 2008

JON W. DUDAS
*Director of the United States Patent and Trademark Office*